Feb. 16, 1954

R. A. CELIEN 2,669,317

TRACTOR FOR SEMITRAILERS AND THE LIKE

Filed Oct. 4, 1951

INVENTOR:
RAYMOND A. CELIEN
BY

ATT'Y

Patented Feb. 16, 1954

2,669,317

UNITED STATES PATENT OFFICE 2,669,317

TRACTOR FOR SEMITRAILERS AND THE LIKE

Raymond A. Celien, Denver, Colo., assignor to The American Coleman Company, Omaha, Nebr., a corporation of Nebraska Application October 4, 1951, Serial No. 249,665

3 Claims. (Cl. 180—89)

My invention relates to a traction vehicle and more particularly to an automotive type tractor adapted for maneuvering semi-trailers in congested areas.

A substantial portion of the motor freight in the United States is hauled by truck type trailers having a fifth wheel mounted horizontally on the rear portion of the tractor frame for supporting engagement with a corresponding member mounted on the lower surface of a semi-trailer unit. The conventional semi-trailer unit generally consists of an elongated windowless body, having road wheels supporting the rear portion of the vehicle and auxiliary wheels under the forward portion of the body for supporting the semi-trailer when not attached to a tractor. The tractors utilized in hauling the semi-trailer along the highway, herein termed road tractor, are conventionally short, powerful, heavy, and relatively expensive vehicles having an operator's cab including doors, windows, and the like, which protect the operator from the weather, but which also at least partially obscure the operator's vision to the rear, this being partially objectionable when attempting to back a semi-trailer into a parking space.

During loading and unloading operations a number of semi-trailers are frequently parked in the yard and ordinarily will be moved several times before the operation is completed. Conventionally, road tractors are employed for this purpose, but this is not considered desirable since it not only ties-up expensive equipment, but it also is inefficient in that the road tractors are not well suited to the operation.

A primary object of my invention is to provide an inexpensive, highly maneuverable automotive type tractor particularly suited for parking semi-trailers in a predetermined location in a yard or the like, and for hauling such vehicles over such short distances, which offers a maximum range of vision to the operator and which permits the operator to glance rearwardly along the left side of a semi-trailer without inconvenience.

A further object of my invention is to provide a cabless vehicle of the type described incorporating a novel and advantageous arrangement of the operator's seat, controls, and engine, all arranged in such a manner as to provide maximum maneuverability and vision.

Other important objects of my invention will be disclosed in the course of the following description and in the appended drawings in which.

Figure 1:
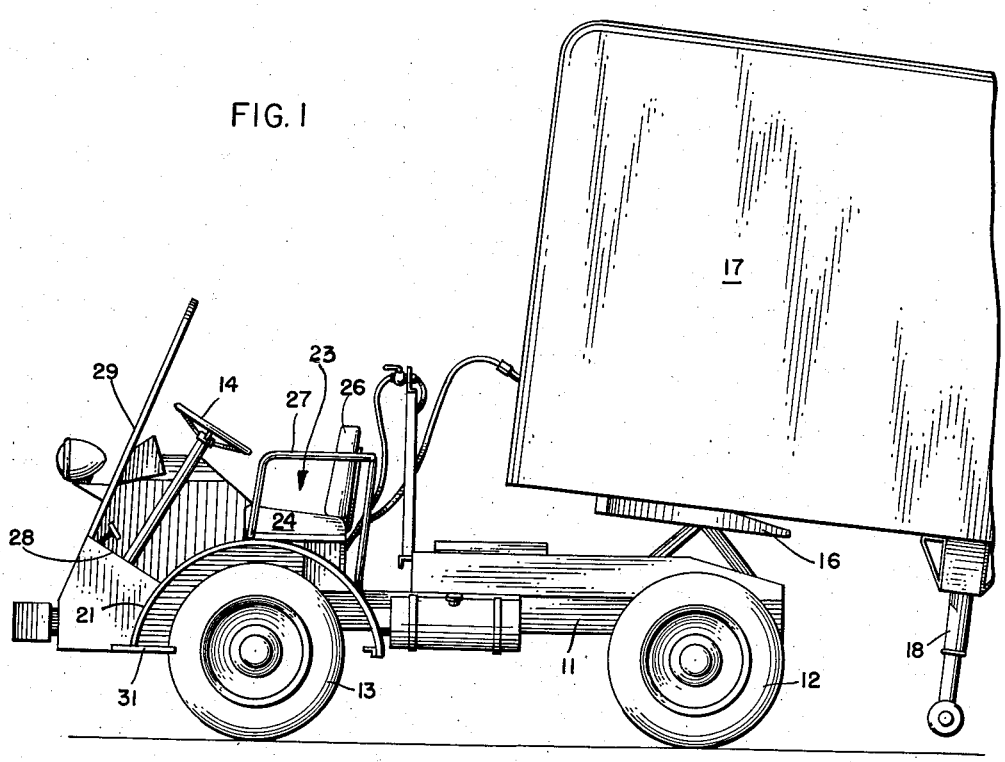
Fig. 1 is an elevation of my device coupled to a semi-trailer.
Figure 2:
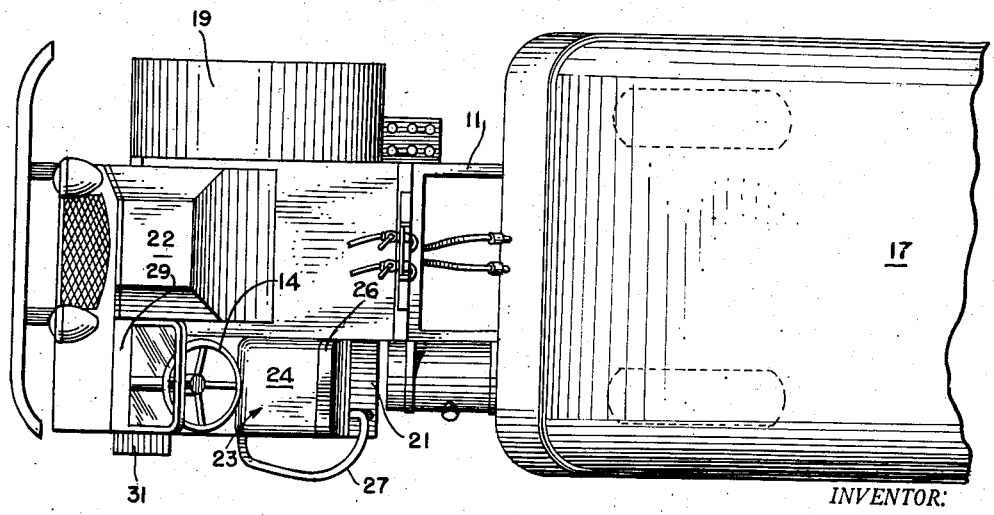
Fig. 2 is a plan view of the device illustrated in Fig. 1.

My vehicle includes a relatively short, heavy frame 11 of generally rectangular configuration, having rear wheels 12 mounted on the conventional rear axle (not shown) and front wheels 13 also of conventional design, the latter being coupled for steering movement to a steering wheel 14. A fifth wheel device 16 is disposed above the rear wheels 12 for pivot supporting engagement with a corresponding member on lower surface of the forward portion of a semi-trailer body 17. Auxiliary body support wheels 18 are secured to lower surface of the semi-trailer body 17 immediately to the rear of the fifth wheel device 16.

A right front fender 19 and a left front fender 21 extend over the right and left front wheels 13, respectively, the fenders being relatively heavy and secured to the frame 11. An engine (not shown) is supported by the frame 11 between the left and right front fenders 19 and 21 in conventional manner for driving at least the rear wheels 12, and is covered by a hood 22 which extends upwardly only a short distance above the level of the fenders 19 and 21. An operator's seat generally designated 23 includes a seat portion 24 and a back 26 each secured to the other and mounted on the upper surface of the left front fender 21 with the forward portion of the seat 24 approximately above the center of the left front wheel 13. A curved rail 27 is secured to the seat 23 and extends laterally outward therefrom to the left. The outermost portion of the rail 27 should be disposed approximately in a plane including the left side of the semi-trailer body 17 when in alignment with my tractor, the outer edge of the seat portion 24 being disposed not more than 12" inwardly from the rail. A foot rest 28 extends forwardly and upwardly from the left front fender 21 into engagement with a dash and windshield 29 which projects upwardly and rearwardly from the forward extremity of the foot rest 28. A horizontal step 31 is secured to the forward lower extremity of the left front fender 21 below the level of the foot rest 28. The various engine and vehicle controls and accessories are disposed as indicated in conventional manner.

In most instances the rear wheels 12 will be of the dual-type mounting a total of four axially aligned wheels on the rear axle. The distance between the extremities of these wheels should be the maximum width of my vehicle and should correspond approximately with the width of the semi-trailer body 17. The upper extremity of the hood 22 should not be above a level of the rail 27. When so proportioned, it will be seen that an operator in the seat 23 has unobstructed vision normally throughout an arc of approximately 270° due to the elimination of a cab or operator's enclosure and the position of the driver's seat and can lean to the left against the rail 27 to glance rearwardly along the left side of the semi-trailer body 17 without danger of falling from the seat or being required to hold open the door of a cab.

In the foregoing it will be apparent to those skilled in the art that the vehicle herein described may utilize an exceptionally short wheel base and a small turning radius, making it highly maneuverable. In addition, since it is not required to move heavy loads in high speeds along the highway, the engine employed as well as the power train connecting the engine to the wheels may be substantially lighter than that ordinarily employed in road tractors. The elimination of the cab not only provides the operator with clearer, improved vision, but also naturally reduces the cost of tractor construction.

I claim:

1. A tractor for hauling semi-trailers and the like, comprising a generally rectangular frame, a fifth wheel on the rear portion of the frame for engagement with the corresponding member on a semi-trailer, front and rear road wheels on the frame, said rear road wheels defining a maximum tractor width approximately equal to the width of said semi-trailer, left and right front fenders on the frame over the front road wheels, an operator's station including a seat on the upper surface of the left front fender, said station being open on the top and on three sides and closed by a front wall containing a windshield, whereby the operator is afforded unobstructed vision on the open sides and top and within the limits defined by the windshield, an outwardly projecting guard rail along the outer side of the driver's seat, the outer extremity of said rail being approximately in the same vertical plane as the outer extremity of the left rear road wheel, an operator's foot rest secured to the left front fender below the operator's seat and projecting forwardly and upwardly therefrom, operating controls including steering, clutch, brake and throttle controls projecting upwardly through the foot rest towards the operator's station, a step secured at the left front fender below the foot rest and an engine hood between said fenders, said hood also being disposed between the inner side of said seat and said right fender and having its upper extremity disposed below the line of vision of an operator seated in the operator's seat, said upper extremity of the hood being approximately at the level of said guard rail.

2. A tractor for hauling semi-trailers and the like, comprising a generally rectangular frame, a fifth wheel on the rear portion of the frame for engagement with the corresponding member on a semi-trailer, front and rear road wheels on the frame, said rear road wheels defining a maximum tractor width approximately equal to the width of said semi-trailer, left and right front fenders on the frame over the front road wheels, an operator's station including a seat on the upper surface of the left front fender, said station being open on the top and on three sides and closed by a front wall containing a windshield, whereby the operator is afforded unobstructed vision on the open sides and top and within the limits defined by the windshield, the outer extremity of said seat being approximately in the same vertical plane as the outer extremity of the left rear road wheel, an operator's foot rest secured to the left front fender below the operator's seat and projecting forwardly and upwardly therefrom, operating controls including steering, clutch, brake and throttle controls projecting upwardly through the foot rest towards the operator's station, a step secured to the left front fender below the foot rest, an engine hood between the inner side of said seat and the right front fender, the top of said hood being disposed below the line of vision of an operator seated in the operator's seat.

3. A tractor for hauling semi-trailers and the like, comprising a generally rectangular frame, a fifth wheel on the rear portion of the frame for engagement with the corresponding member on a semi-trailer, front and rear road wheels on the frame, said rear road wheels defining a maximum tractor width approximately equal to the width of said semi-trailer, left and right front fenders on the frame over the front road wheels, an operator's station including a seat on the upper surface of the left front fender, said station being open on the top and on three sides and closed by a front wall containing a windshield, whereby the operator is afforded unobstructed vision on the open sides and top and within the limits defined by the windshield, an outwardly projecting guard rail along the outer side of the driver's seat, the outer extremity of said rail being approximately in the same vertical plane as the outer extremity of the left rear road wheel, an operator's foot rest secured to the left front fender below the operator's seat and projecting forwardly and upwardly therefrom, operating controls including steering, clutch, brake and throttle controls projecting upwardly through the foot rest towards the operator's station, and an engine hood between said fenders, said hood also being disposed between the inner side of said seat and said right fender and having its upper extremity disposed below the line of vision of an operator seated in the operator's seat, said upper extremity of the hood being approximately at the level of said guard rail.

RAYMOND A. CELIEN.

References Cited in the file of this patent

UNITED STATES PATENTS

| Number | Name | Date |
| --- | --- | --- |
| 1,005,065 | Parrish | Oct. 3, 1911 |
| 1,158,223 | Huschle | Oct. 26, 1915 |
| 2,249,356 | Goodman | July 15, 1941 |
| 2,295,769 | Zeilman | Sept. 15, 1942 |
| 2,311,941 | Gustafson | Feb. 23, 1943 |
| 2,457,400 | Roos | Dec. 28, 1948 |